Jan. 21, 1964  A. S. KOLLOCK  3,119,015
FLEXIBLE THIN SHEET X-RAY FILM HOLDERS
Filed Jan. 24, 1961  2 Sheets-Sheet 1
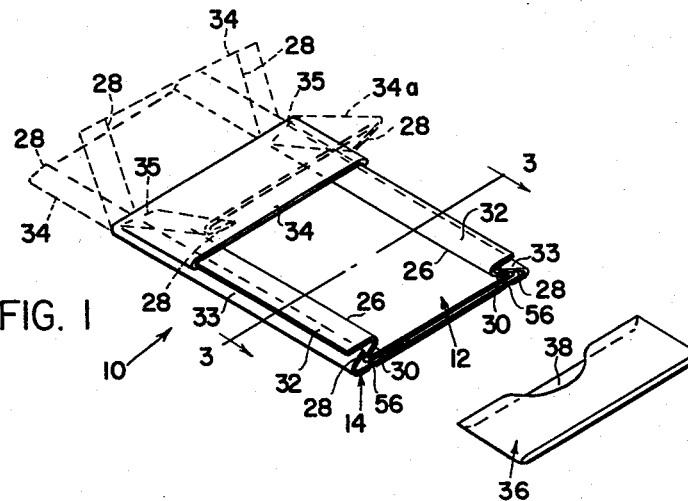
FIG. 1
FIG. 2
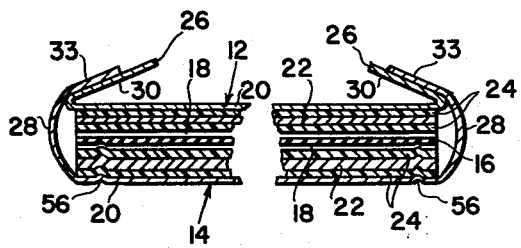
FIG. 3
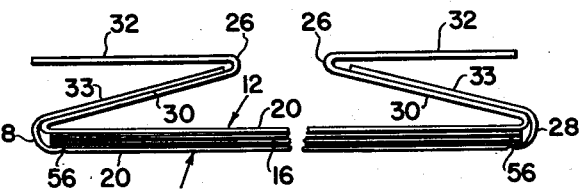
FIG. 4
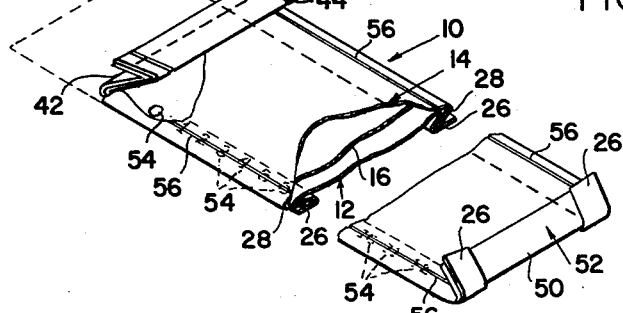
FIG. 5
*INVENTOR.*
ALAN S. KOLLOCK
BY *Jerome Bauer*
ATTORNEY.

Jan. 21, 1964 A. S. KOLLOCK 3,119,015
FLEXIBLE THIN SHEET X-RAY FILM HOLDERS
Filed Jan. 24, 1961 2 Sheets-Sheet 2

*INVENTOR.*
ALAN S. KOLLOCK
BY
ATTORNEY.

United States Patent Office 3,119,015
Patented Jan. 21, 1964

3,119,015
FLEXIBLE THIN SHEET X-RAY FILM HOLDERS
Alan S. Kollock, New Hyde Park, N.Y., assignor to General Magnaplate Corporation, Belleville, N.J., a corporation of New Jersey
Filed Jan. 24, 1961, Ser. No. 84,687
6 Claims. (Cl. 250—68)

This invention relates to film holder devices and particularly to devices for holding film for making industrial radiographs, although the same is not specifically limited thereto.

In industrial radiography, it is often necessary to determine the internal structure of portions of curved or irregularly shaped bodies. In consequence, it is necessary to locate the source of penetrating radiographic rays on one side of the body while the film is applied as closely as possible to the other side of the body. In such cases, the film holder must be capable of being extremely flexible without, however, wrinkling or creasing; otherwise, extraneous indications or erroneous lines will result in the radiograph. Furthermore, the film holder should be so constructed as to permit the same to be wrapped snugly about or conformed to the object to be radiographed.

Another object of the invention is to provide a disposable film holder device that is simple in structural details, inexpensive to manufacture and capable of being made in unusually large rolls whereby desired lengths of the same containing the radiographic film may be cut directly from the roll for use and then disposal after the film is developed. This is one application for which no practical film holder device has yet been developed.

Still another object of the invention is to provide a film holder device having sheets overlying a film member and in snug contact with intensifying screens to increase the sensitivity of the film to X-ray and to expedite the production of the radiograph.

Still a further object of the invention is to provide a film holder in which sheet members overlying a film member are connected by a unique arrangement of light-tight securing means that permit relative movement between the sheet members and apply radial force to the same to eliminate the formation of deleterious air pockets therebetween.

Figure 6:
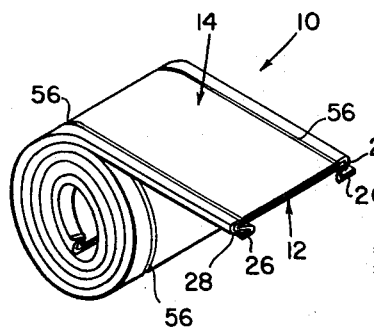
Figure 7:
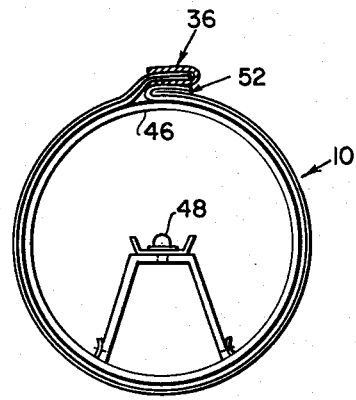
Figure 8:
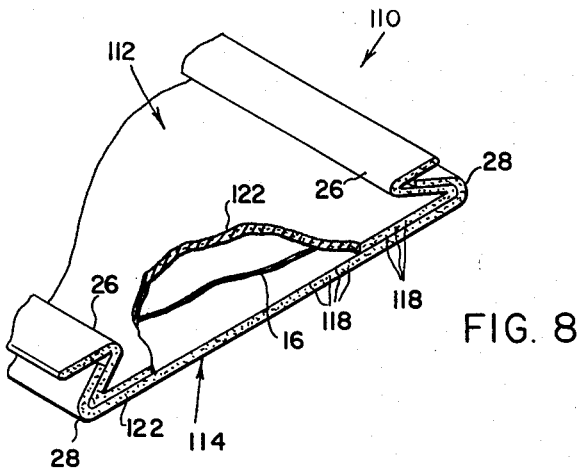

Other and further objects of my invention reside in the structures and arrangements hereinafter more fully described with reference to the accompanying drawings in which:

FIG. 1 is a perspective view of a film holder device constructed according to the teaching of the invention, FIG. 2 is a perspective view of an end closure cap, FIG. 3 is an enlarged partial cross-section of FIG. 1 taken along lines 3—3, FIG. 4 is a view similar to FIG. 3 with the longitudinal edges thereof arranged in connecting relationship, FIG. 5 is a perspective view of the film holder device of FIG. 1 illustrating variations in certain of its details, FIG. 6 is a perspective view of a large roll of the inventive film holder device, FIG. 7 illustrates one method of applying the invention to a cylindrical shape, and FIG. 8 is an enlarged cross-section of a length of a modification of the film holder device of FIG. 1.

Referring now to FIGS. 1 to 4 of the drawings, the film holder device thereshown is generally identified by the numeral 10. Film holder device 10 comprises a pair of sheet-like members 12 and 14, each of which is almost paper thin, flexible and crease-resistant in construction. For ease of explanation, the sheet member 12 will be referred to as the back or rear while the sheet member 14 will be referred to as the front or face. The sheet members 12 and 14 are adapted to be arranged in overlying relationship and to snugly retain therebetween a length of film 16 (see FIGS. 3 and 4).

Although the sheet members 12 and 14 are illustrated in the drawing as being substantially symmetrical in construction, it will be recognized as the description proceeds that certain of the details of any selected one of such members may be varied in a manner to be described. Thus, normally each sheet member 12 and 14 includes a surface layer or lamination 18 of suitable material that will serve as a barrier against and filter of scattered radiation and/or also perform the function of an intensifying screen. Intensifying screen 18 may be made of such suitable material as lead, copper, tin, calcium tungstate and the like. The intensifying or filtering screen lamination 18 is usually sufficiently opaque and imperforate to prevent the passage of light therethrough.

To aid in prevention of the stray passage of light through the intensifying screen 18, each sheet member 12 and 14 includes a layer 20 of material that is opaque to light. In the present invention the layer of material 20 may take the form of a thin sheet of aluminum or any other suitable flexible but opaque material. The layer of aluminum 20 acts as a secondary barrier to prevent the passage of whatever light may have passed through pores or microscopic holes that may be present in the intensifying screen 18. Also included in the composite construction of each of the sheet-like members 12 and 14 is an intermediate body or support layer 22 of flexible wrinkle and crease-resistant plastic material. In practice, it has been found that a very thin layer of Mylar plastic is unusually well suited for the purpose of providing body and support to the thin laminations of intensifying screen 18 and light opaque material 20 of each of their respective sheet-like members 12 and 14.

The thin intermediate layer of supporting material 22 is normally crease and wrinkle resistant and therefore aids in preventing the formation of wrinkles or creases in their respective layers of intensifying screen 18 and opaque light filters 20. In practice, it has been found difficult to bond together the layers or laminations of the intensifying screen 18, the intermediate support body member 22 and the light opaque layer or lamination 20. To overcome this difficulty, intersticed between each of the layers adjacent 18, 22, and 20 is an additional extremely thin lamination of soft pliable plastic 24, as polyethylene. It has been found that the laminations of plastic 24 can be easily bonded on their sides to the intensifying screen 18, the supporting body 22 and the light opaque layer 20. It has been found that if the body support layer 22 is made of a material that is opaque to light, the layer 20 and its adjacent bonding layer of plastic material 24 may be eliminated.

Referring to FIG. 3, although it will be noted that the layer 20 of light opaque material is wider than and extends beyond the lateral edges of the remaining layers 24, 22, and 18, bonded to the same, all of the laminations bonded together to form their respective sheets 12 and 14 may be of the same width. Hence, although the invention includes a description of the layers 20 being of greater widthwise extent than their remaining integrally joined laminations, the same is not intended to constitute a limitation on the scope of the invention.

The edgewise extensions of the sheet member 12, formed on the layer 20 thereof, are identified by the numeral 26, while the edgewise extensions of the sheet member 14, also formed on the layer 20 thereof, are denoted by the numeral 28. The edgewise extensions 26 of the rear sheet member 12 are bent substantially into the shape of a Z in cross-section for the full length of the opposite longitudinal edges of the sheet. The Z-shaped extensions 26 now include a sloping leg 30 and a top leg 32. The edgewise extensions 28 of the front sheet member 14 are then bent into engagement with the sloping leg 30 of the adjacent Z-shaped extensions 26 in the manner shown at legs 33 in FIG. 4. The engaging legs 33 of the extensions 38 ride lengthwise along the adjacent face of the sloping leg 30 to permit relative movement between the front and rear sheet members 14 and 12. The surface engagement between the legs 33 and 30 prevent light from entering between the members 12 and 14 so that the film 16 therebetween is retained in light-tight enclosure. The top leg 32 of the Z-shaped extensions 26 complete and reinforce the light-tight enclosure by snugly overlaying or extending along the length of the respective bent leg 33 therebeneath.

The film holder device 10 is made inexpensively and in a long continuous length with the sheet-like members 12 and 14 positioned in overlying relationship on opposite sides of the length of film strip 16 as shown in FIGS. 3 and 4. The edge-wise extensions 26 and 28 being engaged and cooperating in the light-tight manner previously described to prevent accidental or unwanted exposure of the film 16. The continuous length of the film holder device 10 may be conveniently spooled into a large roll as shown in FIG. 6. Subsequently, as desired lengths of the film 16 are required, the roll of the film holder device 10 shown in FIG. 6 is unwound until a desired length thereof is selected and simply cut by knife or scissors from the roll. Since the total thickness of the holder device 10, including the film 16, is less than one thirty-second of an inch ($\frac{1}{32}''$) at its thickest dimension, namely, along the engaging edgewise extensions 26 and 28, selected lengths are easily severed from the roll of FIG. 6. A severed length of the film holder 10 is illustrated in FIG. 1.

In FIG. 1, the front sheet member 14 has been moved or slid to the left of the rear sheet member 12 to more readily show how a light-tight closure flap 34 may be formed. The flap 34 is bent upward from its dash line position so that its opposite edgewise extensions 28 are bent hard at the corners 35 and then into flat overlying position with respect to the intensifying screen 18. Thereafter, the sheet member 12 is moved back to the left so its top legs 32 slide over the respective legs 33 of the flap 34 and within the confines of the flap to be light-tightly encompassed by the same. The harsh bend at 35 is sufficient to overcome the normal crease resistance of the layer 22.

The ends of the sheet members 12 and 14 may also be closed in any other convenient manner by the alternative use of a cap or envelope generally identified by the numeral 36, shown in FIG. 2. The cap or envelope 36 has an opening 38 that closely approximates the contour of the ends of the sheet members 12 and 14 and accommodates the same therein by sliding over the ends of such sheet members to fully enclose and tightly encompass the same for a substantial length thereof.

Although FIGS. 1 and 2 depict two convenient forms of closing and preventing the penetration of light to the film 16 at the ends of the sheets 12 and 14, FIG. 5 illustrates another form for light-tightly closing such ends and still permit relative longitudinal movement of the sheet members. In FIG. 5, the film holder 10 is shown in its inverted position with the front sheet member 14 on the top and rear sheet member 12 on the bottom. The rear sheet member 12 has been moved to the left and exposes a flap or closure portion of its length 40 that extends beyond the end of the front sheet member 14 as illustrated by the dash lines.

The exposed portion 40 of the sheet members 12 is initially flat. The adjacent end of the sheet member 14 is light-tightly closed by first holding a flap 40 at 42 over the end of the sheet member 14 to cover the same. A second reinforcement fold is then made at 44 to reinforce the first fold 42 since the intermediate lamination 22 resists the formation of creases or wrinkles in the body of the sheet member. The flap 40 extends over a lengthwise portion of the adjacent end of the sheet member 14 to prevent light from penetrating to the film 16 during relative movement of the sheet members 12 and 14. The flap 40 is capable of being formed quickly and easily without the requirement of any special mechanical skill or aptitude and is especially convenient for use in field operations. If the folds 42 and 44 are made with sufficient pressure, they will remain in the sheet 12 in spite of the normal crease resistance of layer 22.

FIG. 7 illustrates the film holder 10 in actual use about a metallic cylinder 46 to be radiographed. The X-ray tube or radiating material 48 is positioned within the cylinder 46 while the film holder 10 is snugly wrapped thereabout. The film holder 10 may utilize or incorporate any one of the light-tight closures 34 or 36 at one of its ends; therefore, the illustration of the closure flap 36 is for purposes or explanation only. It is significant that each of the previously described closures 34 and 36 permits relative longitudinal movement between the sheet members 12 and 14 at their adjacent light-tightly closed ends as the device 10 is being wrapped about the cylinder 46. The other end of the length of the film holder device 10 is also closed in a light-tight manner not only to prevent light from entering between the sheet members 12 and 14 and penetrating to the film 16 retained therebetween, but also to prevent or restrain relative longitudinal movement between the sheet members 12 and 14 thereat. FIG. 5 illustrates a simple and easy manner of accomplishing the desired results.

Referring to FIG. 5, a modified form of light-tightly securing closed sheet members 12 and 14 of the film holder device 10 is shown at the right-hand end. The sheet members 12 and 14 are secured from relative movement and light-tightly closed simply by forcefully folding over a length of both of the sheet members 12 and 14 together as at 50. The resultant flap generally identified by the numeral 52 may be of reasonable length to prevent the passage of light to the length of the film extending between the fold line 50 and the opposite longitudinal end of the sheet member 14. With the sheet members 12 and 14 of the device 10 restrained from longitudinal movement at one of their lengthwise portions 52, as the device 10 is wrapped about the periphery of the metallic cylinder 46, the sheet members move relative to each other along their lengths distant from the restraining flap 52. The closure flap 40 permits such relative movement to occur at the opposite end without, however, permitting the penetration of light therebetween.

Because of the extreme thinness of the film holder device 10, the engaged edgewise extensions 26 and 28 bend smoothly and easily about the contour of the workpiece 46 and are prevented from wrinkling by the laminations contained in the bodies of their respective sheet members 12 and 14. As the device 10 is being wrapped about the workpiece 46, any air that may be contained between the surfaces of the film 16 and the adjacent intensifying screens 18 will be forced to move progressively to the open ends of the sheet members 12 and 14 and outward therefrom at the closure cap 36. The air escape opening afforded at the closure flap 40 enables the elimination of air pockets and permits the intensifying screens 18 to snugly hug the film 16 on its opposite sides to make the film more sensitive to X-rays and reduce the time necessary for exposure and production of the radiograph.

When the film holder 10 is wrapped about the workpiece 46, its smooth uninterrupted surface of its sheet member 14 is placed into overlying relationship with the workpiece. In consequence, as the film holder 10 is smoothly wrapped about the workpiece, the edgewise extensions 26 and 28 are pulled tightly against the outer surface of the sheet member 12 bringing the legs 30 into abutting surface engagement with the outer surface of the sheet member 12. Similarly, the legs 33 are pulled closer to the sheet member 12 and the top legs 32 are pulled down into overlying relationship with the legs 33.

This cooperation of leg structures of the edgewise extensions 26 and 28 provides a light-tight enclosure along the longitudinal edges of the sheet members 12 and 14. Also, the legs move flatly into closer surface abutment with the exposed surface of the sheet member 12, they pull their respective sheet members laterally toward the edges, smoothing them and bringing the intensifying screen laminations 18 of their respective sheet members into complete surface engagement with the film 16 therebetween.

The roll of film holder material 10 shown in FIG. 6 may be marked in ink or impressed directly on the intensifying screen 18 with continuous repetitions of indicia means such as the inch or metric numerals 54 shown in FIG. 5 and/or the name or other identifying symbols of the laboratory or organization for whom the radiograph is being prepared. The indicia means 54 enable exact alignment of portions of the film 16 with peripheral portions of the workpiece 46. Because the indicia means 54 are marked or impressed directly on or in the inner surface 18 of the sheet member 12, when the radiograph is completed, such indicia means will appear on the developed film 16. Hence, if the radiograph should indicate the presence of a flaw in the cylinder 46, the location of such flaw may be quickly determined by counting from an initial mark made on the cylinder 46, which mark was aligned with the "0" indicia mark 54 of the film holder device 10 that was wrapped about the periphery of the cylinder 46. In this manner, details appearing on the film 16 may be co-related with the surface of the radiographed material 46 quickly and simply without the need for additional lead numerals that must be taped or otherwise secured to the film holder 10 or to the surfaces of the part being radiographed as is now the practice in the art of radiography.

Sheets 12 and 14 of the film holder device 10 comprise surfaces of normally crease-resistant opaque material and an intensifying screen material. However, in the practice of this invention, it has been found possible to impregnate a crease-resistant sheet of rubber or plastic material with a flour-like substance or flecks of intensifying screen material, such as lead. In FIG. 8, the embodiment of the film holder device generally identified by the numeral 110 comprises sheets 112 and 114 that are completely devoid of any distinct surface or lamination of materials as previously described in connection with the embodiment 10. Rather, each sheet 112 and 114 comprises a single flexible member 122 in which there is randomly disbursed throughout the length and width of the body thereof the flour or flecks of the intensifying screen material 118 impregnated therein.

The random dispersal of a sufficient amount of intensifying screen material throughout the sheets 112 and 114 will enable the same to perform the function of a solid surface of intensifying screen in the same manner as screens 18 of the previously described embodiment 10. The remaining structural details of the edgewise extensions 26 and 28 of the sheets 112 and 114 and their operation are the same as described with respect to embodiment 10; therefore, a repetition of such details would be redundant. Although not illustrated, the present embodiment 110 may also include indicia means of the type 54 as provided on the film facing surfaces of the sheets 12 or 14 in the manner previously described.

In practice it has been found that if the length of the embodiment of the film holder 10 is scored with a shallow notch 56 along its opposite sides, when the film holder is subsequently snugly wrapped about the cylinder workpiece 46, it obviates any tendency toward lateral wrinkling of the sheets 12 and 14.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. In a film holder, a length of film, a single pair of longitudinally extending relatively movable sheets each positioned on opposite sides of said length of film, said sheets each including relatively secured laminations of intensifying screen and normally flexible crease-resistant opaque materials, means on said sheets connecting the same for relative longitudinal movement to retain said intensifying screen against said film, and means on said sheets to prevent their relative longitudinal movement at one portion of their lengths.

2. In a film holder having elongated front and back sheets for retaining a length of film therebetween, said sheets each including an intensifying screen, a flexible crease-resistant material and a material opaque to light each secured together from relative movement, each of said sheets having means to connect the same together for light-tight relative longitudinal movement to retain said intensifying screens against the film therebetween.

3. In a device for holding a length of film, a single pair of sheet members for enclosing said length of film therebetween, each of said sheet members having an intensifying screen, an opaque material, a crease-resistant material and intersticed bonding layers of soft pliable plastic, said pair of sheet members being positioned with their respective intensifying screens in overlying relationship, and means to connect said sheet members for light-tight relative movement and to retain said intensifying screens against film enclosed therebetween.

4. In a device as in claim 3, one of said sheet members having said connecting means being substantially Z-shaped in cross-section and being on opposite longitudinal edges thereof, and the other of said sheet members having said connecting means in light-tight sliding engagement with said first mentioned Z-shaped connecting means.

5. In a film holder, a length of film, a pair of longitudinally extending relatively longitudinally movable sheets each on opposite sides of said length of film, said sheets each including a flexible body of normally crease-resistant opaque material impregnated with an intensifying screen material, and means on said sheets connecting the same for relative longitudinal movement, said means serving to retain said sheets in surface engagement with said length of film.

6. In a film holder, a single pair of longitudinally extending flexible film holder sheet members each being a laminate of opaque and intensifying screen materials, means connecting said sheet members light-tightly together for relative independent lengthwise movement to permit each one of said sheets of said pair of sheet members to flex independently of the other.

References Cited in the file of this patent

UNITED STATES PATENTS

| 2,172,528 | Auer | Sept. 12, 1939 |
| 2,298,587 | Raffman | Oct. 13, 1942 |
| 2,371,843 | Powers | Mar. 20, 1945 |
| 2,390,211 | Forssell | Dec. 4, 1945 |
| 2,494,740 | Boucher | Jan. 17, 1950 |
| 2,769,095 | Forrer et al. | Oct. 30, 1956 |
| 2,894,141 | Kollock | July 7, 1959 |
| 2,904,689 | Masi et al. | Sept. 15, 1959 |
| 2,922,047 | Tour | Jan. 19, 1960 |

FOREIGN PATENTS

| 858,688 | Great Britain | Jan. 11, 1961 |